United States Patent
Stevens, Jr. et al.

(10) Patent No.: US 9,626,119 B2
(45) Date of Patent: Apr. 18, 2017

(54) USING COUNTERS AND A TABLE TO PROTECT DATA IN A STORAGE DEVICE

(71) Applicant: INTEL CORPORATION, Santa Clara, CA (US)

(72) Inventors: William A. Stevens, Jr., Folsom, CA (US); Nitin V. Sarangdhar, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 155 days.

(21) Appl. No.: 14/542,510

(22) Filed: Nov. 14, 2014

(65) Prior Publication Data

US 2016/0139808 A1  May 19, 2016

(51) Int. Cl.
| | |
|---|---|
| *G06F 12/00* | (2006.01) |
| *G06F 13/00* | (2006.01) |
| *G06F 13/28* | (2006.01) |
| *G06F 3/06* | (2006.01) |
| *G06F 21/62* | (2013.01) |

(52) U.S. Cl.
CPC ............ *G06F 3/062* (2013.01); *G06F 3/0622* (2013.01); *G06F 3/0637* (2013.01); *G06F 3/0673* (2013.01); *G06F 3/0689* (2013.01); *G06F 21/6227* (2013.01)

(58) Field of Classification Search
CPC ................ G06F 12/1408; G06F 13/14; G06F 2212/1052; G06F 12/14
USPC ........................................................ 711/163
See application file for complete search history.

(56) References Cited

U.S. PATENT DOCUMENTS

| | | | | |
|---|---|---|---|---|
| 5,740,348 A | * | 4/1998 | Cunliffe | G06F 11/183 707/999.01 |
| 5,943,494 A | * | 8/1999 | Golla | G06F 9/30061 712/238 |
| 7,519,796 B1 | * | 4/2009 | Golla | G06F 9/3814 712/225 |
| 8,327,342 B2 | | 12/2012 | Komatsu et al. | |
| 2002/0029354 A1 | * | 3/2002 | Forehand | G11B 33/121 713/340 |

(Continued)

FOREIGN PATENT DOCUMENTS

WO     2013/095387     6/2013

OTHER PUBLICATIONS

Intel Corporation, "Serial Flash Hardening Product", External Architecture Specification (EAS), Rev 0.7, 2013, 24 pp.

(Continued)

*Primary Examiner* — Sheng-Jen Tsai
(74) *Attorney, Agent, or Firm* — Konrad Raynes Davda & Victor LLP; David W. Victor (57) ABSTRACT

Provided are a system, memory controller, and method for using counters and a table to protect data in a storage device. Upon initiating operations to modify a file in the storage device, a storage write counter is incremented in response to initiating the operations to modify the file. In response to incrementing the storage write counter, write table operations are initiated including setting a table write counter to a storage write counter and setting a table commit counter to the storage commit counter plus a value. The operation to modify the file in response to completing the write table operations. The system commit counter is incremented by the value in response to completing the operation to modify the file.

25 Claims, 7 Drawing Sheets

(56) References Cited

U.S. PATENT DOCUMENTS

| | | | |
|---|---|---|---|
| 2006/0069885 A1* | 3/2006 | Matsui | G06F 11/1435 711/154 |
| 2007/0130226 A1* | 6/2007 | Banerjee | G06F 17/30306 |
| 2007/0239915 A1* | 10/2007 | Saha | G06F 9/526 710/200 |
| 2008/0320263 A1* | 12/2008 | Nemiroff | G06F 21/6209 711/164 |
| 2010/0005457 A1* | 1/2010 | Komatsu | G06F 8/4435 717/145 |
| 2011/0314264 A1* | 12/2011 | Horley | G06F 11/3636 712/227 |
| 2011/0314342 A1* | 12/2011 | Gilkerson | G06F 11/3476 714/45 |
| 2012/0297204 A1 | 11/2012 | Buer | |
| 2013/0159727 A1* | 6/2013 | Sarangdhar | G06F 12/1408 713/189 |
| 2014/0040206 A1* | 2/2014 | Ramakrishnan | G06F 11/2097 707/640 |
| 2014/0089202 A1 | 3/2014 | Bond et al. | |
| 2014/0173750 A1 | 6/2014 | Alkove et al. | |
| 2014/0223198 A1* | 8/2014 | Saranghar | G06F 13/14 713/193 |
| 2014/0337393 A1* | 11/2014 | Burchall | G06F 17/30377 707/826 |
| 2014/0351457 A1* | 11/2014 | Baptist | G06F 3/0659 710/5 |
| 2015/0220396 A1* | 8/2015 | Shirley, Jr. | G06F 11/1092 714/6.23 |
| 2016/0019132 A1* | 1/2016 | Vilakkumadathil | G06F 11/3604 717/126 |

OTHER PUBLICATIONS

Micron Technology, Inc., "Micron Unveils Serial NOR Flash Interface With Replay-Protected Monotonic Counter for Ultrathin Devices", [online], Sep. 10, 2013, [Retrieved on Aug. 25, 2014], Retrieved from the Internet at <URL: http://investors.micron.com/releasedetail.cfm?ReleaseID=789767>, 2 pp.

Micron Technology, Inc., "Mono-what Counter?", [online], Sep. 10, 2013, [Retrieved on Sep. 12, 2014], Retrieved from the Internet at <URL: http://www.micron.com/about/blogs/2013/september/mono-what-counter>, 2 pp.

International Search Report and Written Opinion for International Application No. PCT/US2015/056083, dated Jan. 29, 2016, 10 pp. [77.302PCT (ISR & WO)].

Office Action 1 for TW Application No. 104132690, Dec. 19, 2016, 19 pp. [77.302TW (OA1)].

* cited by examiner

USING COUNTERS AND A TABLE TO PROTECT DATA IN A STORAGE DEVICE

TECHNICAL FIELD

Embodiments described herein generally relate to protecting data in a storage device and managing failure recovery to protect data stored in non-volatile storage devices.

BACKGROUND

A secure execution environment may utilize a monotonic counter to protect against replay attacks. For monotonic counters whose values are incremented, once the count value changes to a higher number, it should not subsequently exhibit a lower value.

It is an important feature of a monotonic counter that it maintains its value across power cycle events so that a replay attack that results in a power cycle event may not alter the monotonic counter.

There is a need in the art for improved techniques for maintaining monotonic counters to protect from replay attacks.

BRIEF DESCRIPTION OF THE DRAWINGS

Embodiments are described by way of example, with reference to the accompanying drawings, which are not drawn to scale, in which like reference numerals refer to similar elements.

DESCRIPTION OF EMBODIMENTS

For current Serial Peripheral Interface (SPI) flash devices, it is not possible to guarantee that when modifying protected data that the operations of writing the data and writing the incremented monotonic counter are indivisible or atomic operations. In current devices, if there is a power failure or other error that occurs, then the operations of the data write and or monotonic counter update may not occur indivisibly.

Described embodiments provide two monotonic counters to track a write to protected data, including a write counter incremented before a write to an anti-replay table and a commit counter incremented after the data is written. At most times these two counters have the same value. When a new replay protected data operation is performed, the write counter may be incremented first, then the anti-replay table updated, and the commit counter incremented next. If there is no failure during these three operations, then the two counters have the same value.

If there is a power failure between any of the above operations, a recovery operation is performed when the two monotonic counters are mismatched. If it is determined that the failure occurred within the context of the file modification operations, then the counters may be set to values as if the write that was occurring during the failure did not occur. If it cannot be determined using the two counters that the failure occurred within the flow of file modification operations, then all the counters and table are reset because of the potential for a replay attack having resulted in a condition where the failure cannot be placed within the flow of the file modification operations.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Certain embodiments relate to storage devices electronic assemblies. Embodiments include both devices and methods for forming electronic assemblies.

Figure 1:
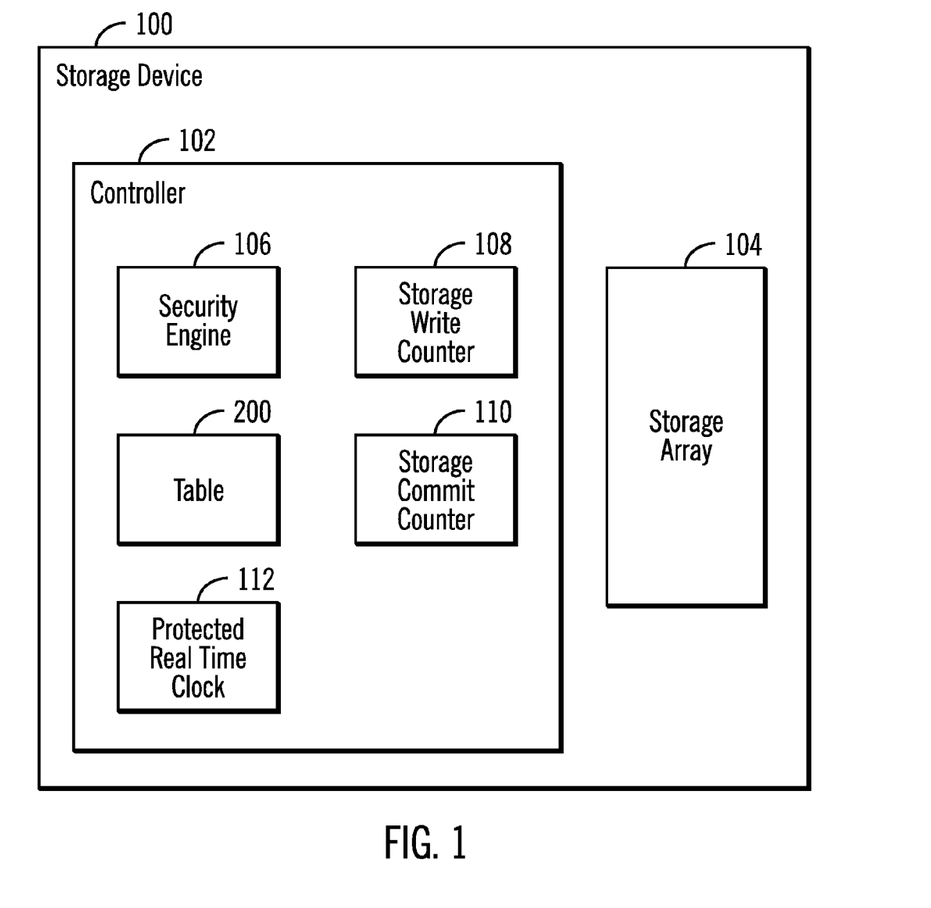
FIG. 1 illustrates an embodiment of a storage device.

FIG. 1 illustrates an embodiment of a storage device 100 including a non-volatile memory controller 102 to perform read, write and failure recovery operations with respect to a memory storage array 104. The storage device 100 may comprise a flash device, an SPI flash device, a solid state storage drive (SSD), a flash controller and flash device (e.g., NAND or NOR), and other read/write storage type devices, such as a memory device, disk drive, etc.

The memory storage array 104 may comprise electrically erasable and non-volatile memory cells, such as flash storage devices. For instance, the memory storage array 104 may comprise NAND dies of memory cells. In one embodiment, the NAND dies may comprise a multilevel cell (MLC) NAND flash memory that in each cell records two bit values, a lower bit value and an upper bit value. Alternatively, the NAND dies may comprise single level cell (SLC) memories. The storage array 104 may also comprise, but is not limited to, MLC NAND flash memory, ferroelectric random-access memory (FeTRAM), nanowire-based non-volatile memory, three-dimensional (3D) crosspoint memory such as phase change memory (PCM), memory that incorporates memristor technology, Magnetoresistive random-access memory (MRAM), Spin Transfer Torque (STT)-MRAM, a single level cell (SLC) Flash memory and other electrically erasable programmable read only memory (EEPROM) type devices.

Figure 2:
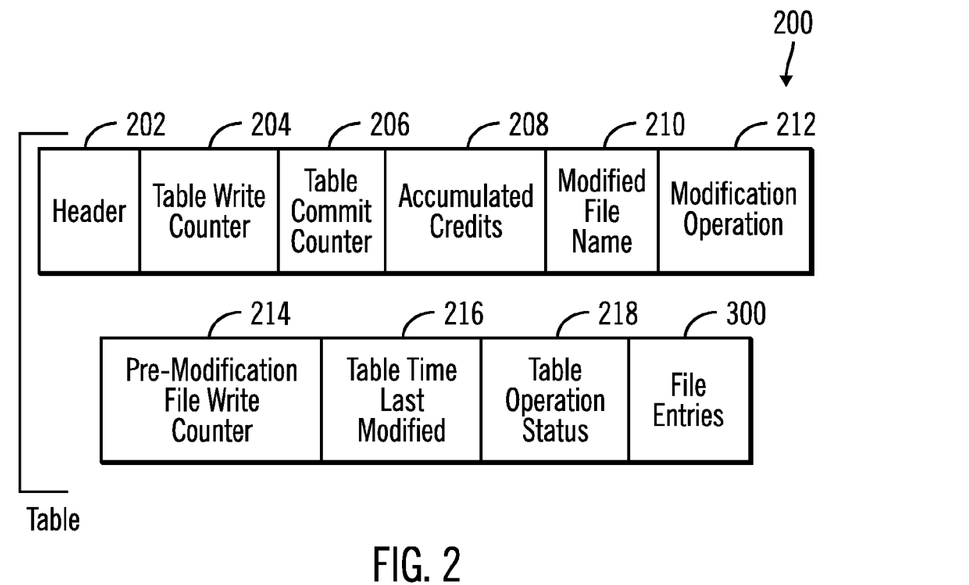
FIG. 2 illustrates an embodiment of a table used to protect from replay attacks.

The controller 102 includes a security engine 106 to protect certain system data maintained in a table 200 having information to protect files indicated in the table against attacks, such as anti-replay attacks. The table 200 includes entries for files that are to be protected against anti-replay attacks. To protect the files identified in the table 200, the security engine 106 maintains a storage write counter 108 incremented when a modification of a file indicated in the table 200 is completed. A file modification operation may comprise an operation to update, create or delete a file. The security engine 106 uses a protected real time clock 112, not accessible to any external hosts, to provide a clock time to use during data protection operations. The counters 108, 110 may be considered as monotonic counters used to protect against replay attacks. The counters 108, 110 and table 200 may be implemented in the storage device 100, such as in the hardware of the controller 102 and/or the storage array 104, or a component external to the storage device 100, such as an interface component.

FIG. 2 illustrates an embodiment of the anti-replay table 200 as including a security header 202; a table write counter 204; a table commit counter 206; accumulated credits 208 to determine whether writes may proceed to the table 200; a modified file name 210 of a file being modified; a modification operation 212 indicating a modify operation being performed on the file 210; a pre-modification file write counter 214 indicating a file 210 write counter before the current modification operation; a table time last modified 216 indicating the protected real time clock 112 value when the table 200 was last modified; a table operation status 218 indicating whether the last operation has an error state after performing a power event routine of FIG. 5; and file entries 300 providing an entry for each protected file in the storage 104.

Figure 3:
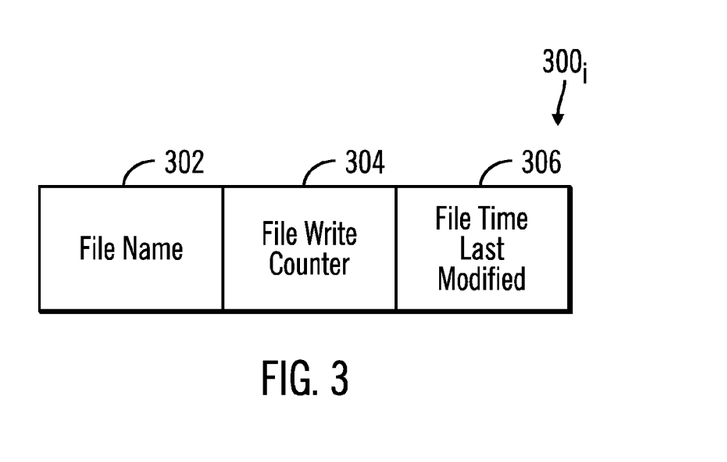
FIG. 3 illustrates an embodiment of a file entry in the table of FIG. 2.

FIG. 3 illustrates an embodiment of an instance of a file entry 300, for one protected file, which includes the file name 302, a file write counter 304 comprising the storage write counter 108 value when the file is updated, and a file time last modified 306 indicating the real time clock 112 value when the file was last modified.

Figure 4:
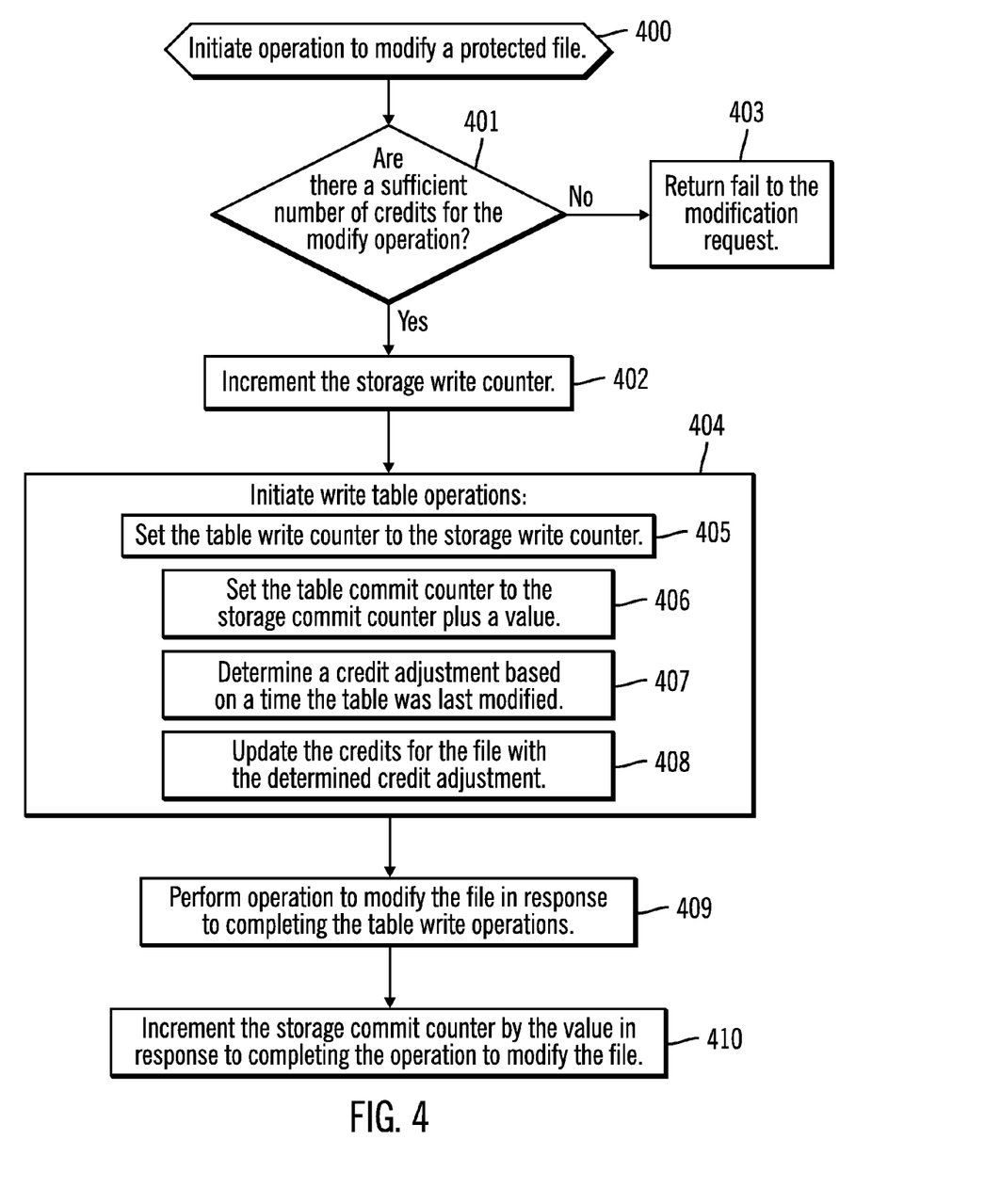
FIG. 4 illustrates an embodiment of operations to modify a protected file in the storage device.

FIG. 4 illustrates an embodiment of operations performed by the security engine 106 to initiate an operation to modify a protected file in the storage 104 for which information is maintained in the table 200. If (at block 401) the number of accumulated credits 208 for the table 200 is sufficient for the requested modification operations to be performed with respect to the table 200, then control proceeds to block 402 to continue processing the modification, otherwise fail is returned (at block 403) to the modification request. If (at block 401) there are sufficient number of credits 208, then the storage write counter 108 is incremented (at block 402) and a series of write table operation 404 are initiated. In one embodiment, all the write table operations 404-408 must successfully complete in order for the write table operations to complete, i.e., they comprise an atomic operation. If one of the operations 404-408 fails to complete, then all the operations fail.

As part of the write table operations 404, the security engine 106 sets (at block 405) the table write counter 204 to the storage write counter 108 and sets (at block 406) the table commit counter 208 to the storage commit counter 210 plus a value, such as one. A credit adjustment is determined (at block 407) based on a time the table was last modified 216 and the accumulated credits 208 for the table are updated (at block 408) by the determined adjustment. In one embodiment the credit adjustment may comprise a difference of the current time as indicated by the clock 112 minus the table time last modified 216 and that difference multiplied by credit adjustment rate, which indicates a rate at which an additional credit are assigned per unit of time if no updates are received during that unit of time.

If all the operations 405-408 complete successfully, then the security engine 106 performs an operation (at block 409) to modify the file if the write table operations 405 are completed. If the write table operations 405 are not all completed, then the write would fail. The storage commit counter 110 is incremented (at block 410) by the value, e.g., one, in response to completing the operation to modify the file.

Figure 5:
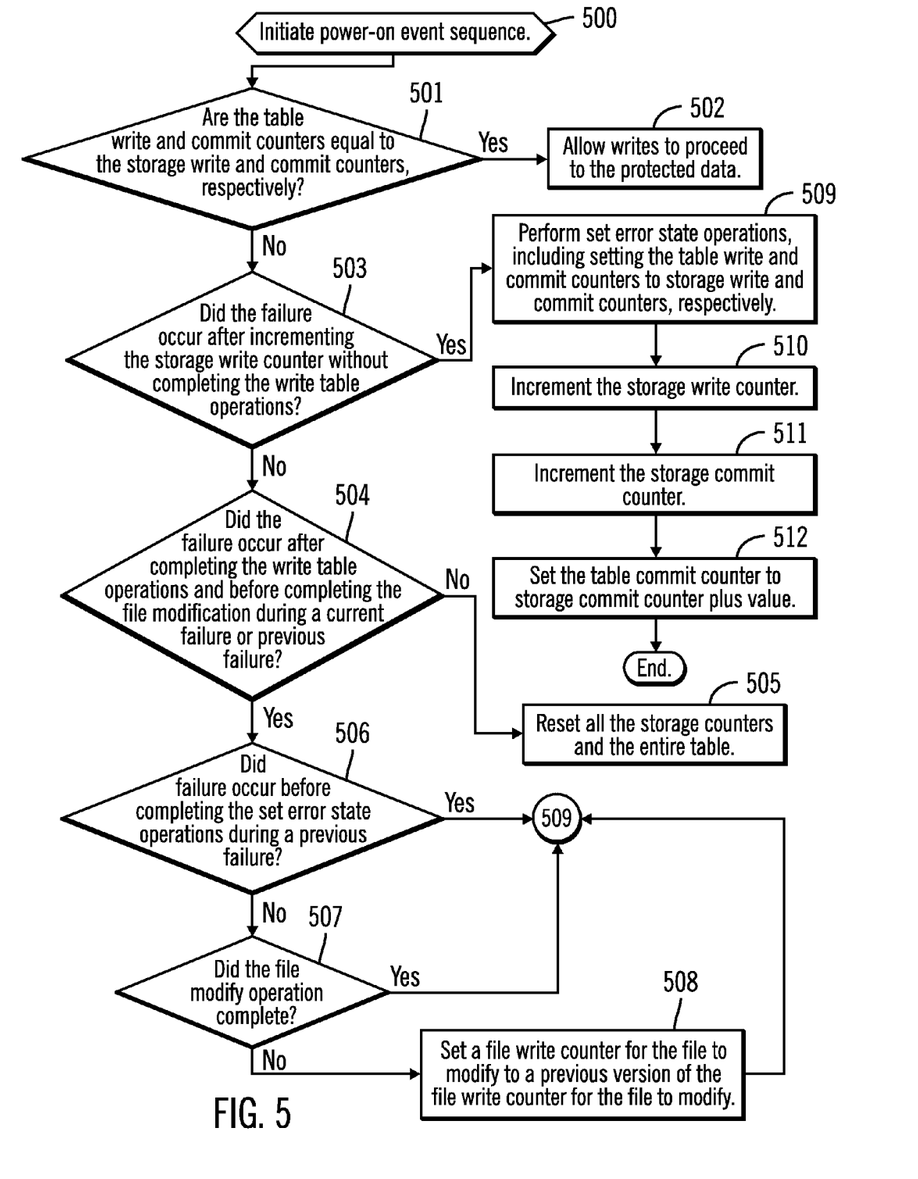
FIG. 5 illustrates an embodiment of operations to perform a power-on event sequence to recover from a power failure.

FIG. 5 illustrates operations the security engine 106 performs upon the storage device 100 experiencing a power-on event. Upon initiating (at block 500) the power-on event sequence, the security engine 106 determines (at block 501) whether the table write 204 and commit 206 counters are equal to the storage write 108 and commit 110 counters, respectively If (at block 501) they are equal, then writes to the protected files indicated in the table 200 may proceed (at block 502). If they are not equal, then a recovery operation needs to be performed at the following operations from block 503 to determine where the failure occurred in the file modification process flow.

At block 503, the security engine 106 determines whether the failure occurred after incrementing the storage write counter 108 without completing the write table operations 404. The determination that the failure occurred after incrementing the storage write counter 108 and before completing the write table operations 404 may be determined when the table write counter 204 is equal to the storage write counter 108 less the value, e.g., one, and the table commit counter 206 is equal to the storage commit counter 110.

If (at block 503) the failure did not occur after incrementing the storage write counter 108 without completing write table operations 403, then a determination is made (at block 504) whether the failure occurred after completing the write table operations 404 and before completing the file modification at blocks 409 and 410. The determination that the failure occurred after completing the write table operations 404 and before committing the write at blocks 409 and 410 during a current failure or previous failure may be determined when the table commit counter 206 is equal to the storage commit 110 counter plus the value, e.g., one, and either (1) the table write counter 204 is equal to the storage write counter 108 or (2) the table write counter 204 is equal to the storage write counter 108 less the value, e.g., one.

If (at block 504) the failure did not occur between completing the write table operations 404 and committing the write at block 410, then that is not a valid combination and control proceeds to block 505 to reset all the storage counters 108, 110 and the entire table 200 because of the possibility the failure and recovery could have been triggered by a replay attempt.

If (at block 504) the failure did occur between completing the write table operations 404 and committing the write at block 410, then a determination is made (at block 506) whether the failure occurred before completing the set error state operations at block 509 during a previous failure. The determination that the failure occurred while trying to perform the set error state operations 509 may be determined when determining that the modified file name 210 is null, which would be set if the set error state operations 509 succeeded. If (from the no block at block 506) the failure occurred after the set error state operations 509 completed, then the security manager 106 determines (at block 507) whether the file modification operation at block 409 in fact completed. This determination may be made by confirming whether the write counter or monotonic counter written with the file to the storage 104 matches the file write counter 304 maintained for the file entry 300, for the file being modified, which in certain embodiments matches if the file was written successfully.

If (at block 507) the file modify operation did not complete, then the security manager 106 sets (at block 508) the file write counter 304 in the entry 300, for the file to modify to a previous version of the file write counter 214 for the file to modify, to return the file write counter 304 to the value before the failed update.

From the yes branch of block 503, the no branch of block 504, the yes branch of block 506, the yes branch of block 507, and block 508 control proceeds to block 509 to reinitialize counters and information. At block 509, the security manager 106 performs set error state operations, including setting the table write 204 and commit 206 counters to the storage write 108 and commit counters 110, respectively. The set error state operations may comprise atomic operations, such that they all must complete for them to complete, else they fail if one of the set error state operations does not complete. After completing the set error state operations, the security manager 106 increments (at block 510) the storage write counter 108 and increments (at block 511) the storage commit counter 110. The table commit counter 206 is set (at block 512) to the storage commit counter 206 plus a value, e.g., one. After block 512, the storage and table counters have been reinitialized to recover from a failure if one occurred during the flow of the operations of FIG. 4.

Figure 6:
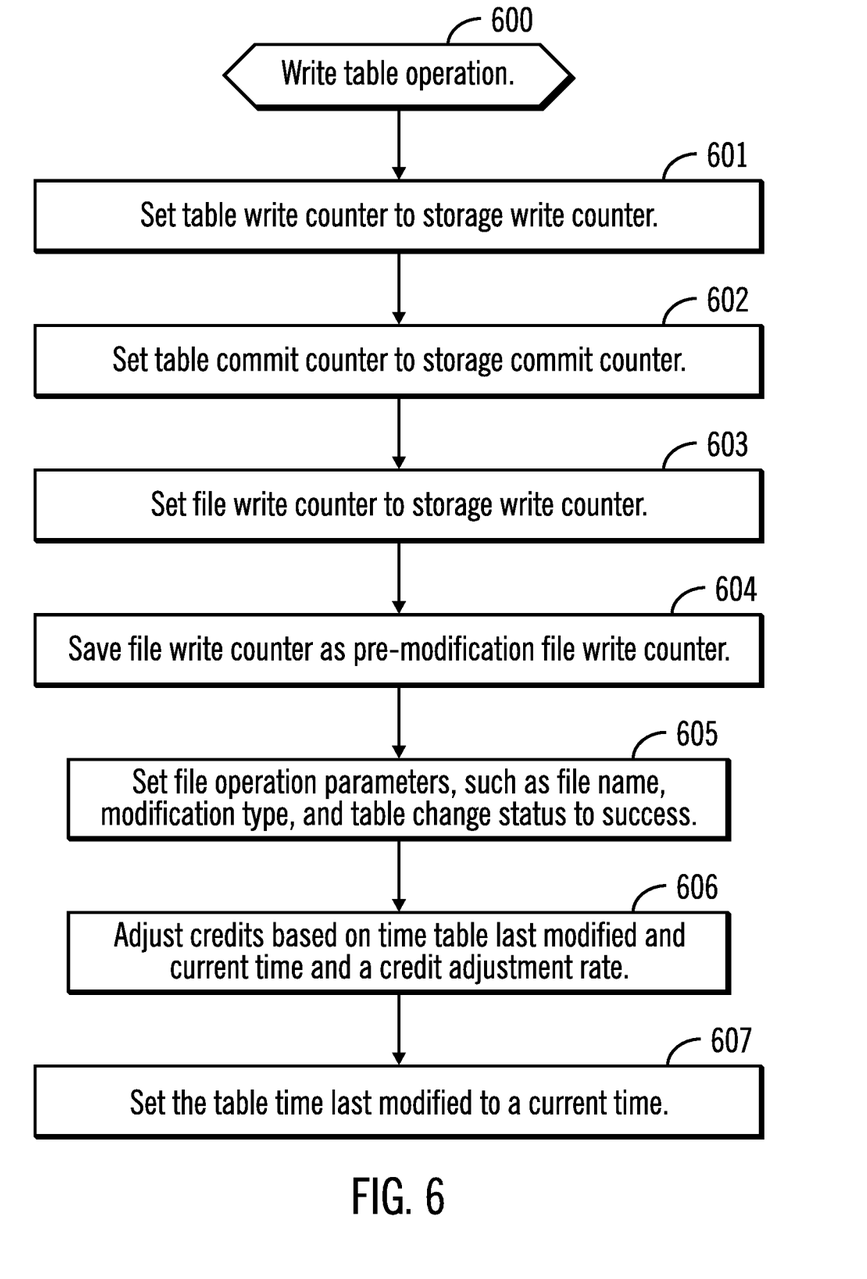
FIG. 6 illustrates an embodiment of table write operations performed during the operations to modify a file.

FIG. 6 illustrates a further embodiment of the write table operations of block 404 in FIG. 4 performed by the security engine 106, which may comprise atomic operations. Upon initiating (at block 600) the write table operations, the security manager 106 sets (at block 601) the table write counter 204 to the storage write counter 108, sets (at block 602) the table commit counter 206 to the storage commit counter 110, sets (at block 603) the file write counter 304 for the file indicated at field 210 in the table 210 to the storage write counter 108, and saves the file write counter 304 as the pre-modification file write counter 214. The security engine 106 further sets (at block 605) file operation parameters for the file that was being modified when the failure resulting in the recovery occurred, such as setting the modified file name 210 to the name of the file being modified, the modification operation type 212, e.g., create, delete, update, NULL, modification type, and table operation status 218 to success. The credits 208 are adjusted (at block 606) based on the table time last modified 210, the current time according to the clock 112, and a credit adjustment rate that may be specified by the storage device 100 manufacturer. In one embodiment the credit adjustment may be calculated by determining a difference of the current clock 112 time and the table time last modified 216, and multiply that difference by the credit adjustment rate, which specifies a credits to add for a unit of time. The table time last modified 216 is set (at block 607) to the current time according to the protected real time clock 112 value.

Figure 7:
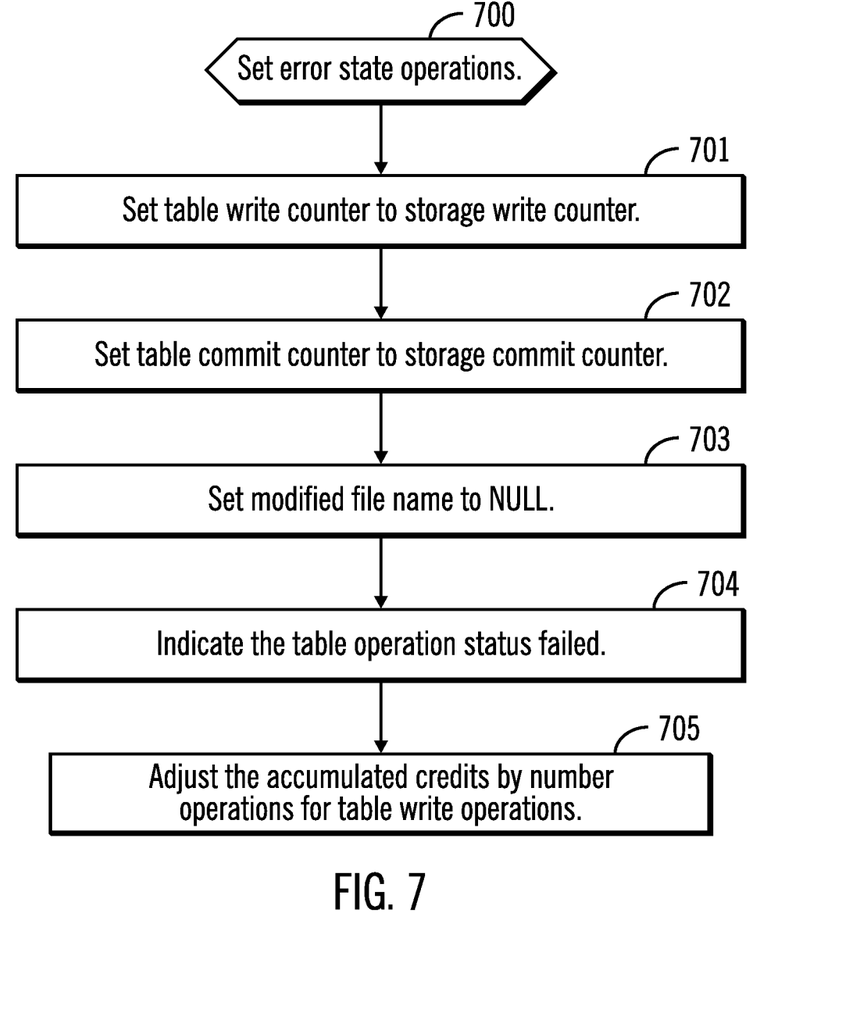
FIG. 7 illustrates an embodiment of set error state operations to perform during a failure recovery.

FIG. 7 illustrates an embodiment of the set error state operations at block 509 in FIG. 5 performed by the security engine 106, which may comprise atomic operations, where all operations must complete in order for the set error state operations to complete. Upon initiating (at block 700) the set error state operations, the security engine 106 sets (at block 701) the table write counter 204 to the storage write counter 108, sets (at block 702) the table commit counter 206 to the storage commit counter 110, and sets (at block 703) the modified file name 210 to NULL. The table operation status 218 is set (at block 704) to failed. The accumulated credits 208 are adjusted (at block 705) by the number of operations required to perform the table write operations.

Figure 8:
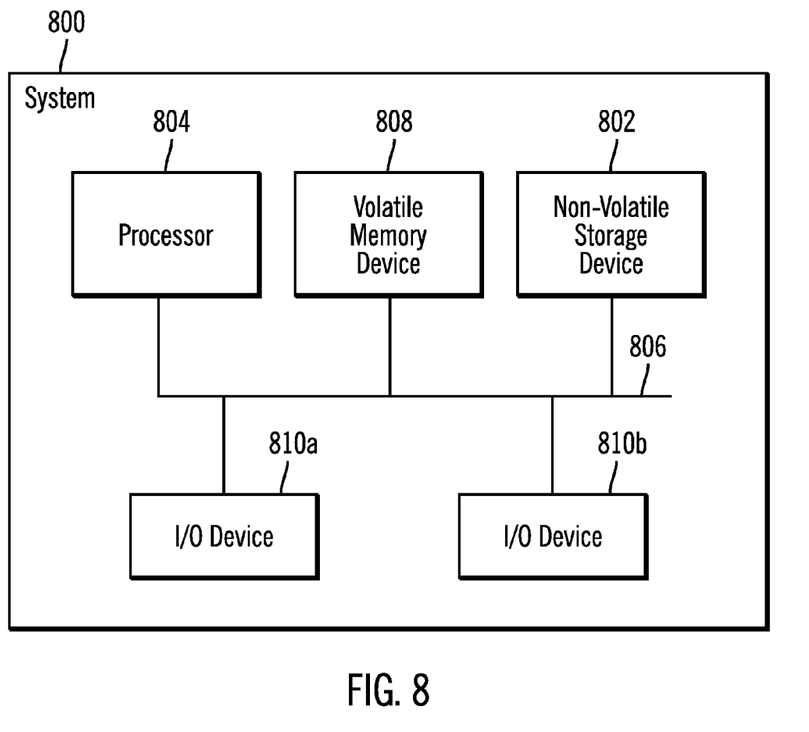
FIG. 8 illustrates a system in which the storage device of claim 1 may be deployed.

FIG. 8 illustrates an embodiment of a system 800 in which a non-volatile storage device 802, such as storage device 100 of FIG. 1, may be deployed. The system includes a processor 804 that communicates over a bus 806 with a volatile memory device 808 in which programs, operands and parameters being executed are cached and the non-volatile storage device 802, in which data and programs may be stored. The processor 800 may also communicate with Input/Output (I/O) devices 810a, 810b, which may comprise input devices, display devices, graphics cards, ports, network interfaces, etc. The non-volatile storage device 802 may be mounted to the system enclosure 800, such as in a storage drive bay, or connected to the system 800 through a port interface or over the network.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of embodiments of the invention, various features are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed subject matter requires more features than are expressly recited in each claim. Rather, as the following claims reflect, inventive aspects lie in less than all features of a single foregoing disclosed embodiment. Thus, the claims following the detailed description are hereby expressly incorporated into this detailed description.

The described operations of the security engine 106 may be implemented as a method, apparatus or computer readable storage medium using standard programming and/or engineering techniques to produce software, firmware, hardware, or any combination thereof. The described operations may be implemented as code or logic maintained in a "computer readable storage medium", which may directly execute the functions or where a processor may read and execute the code from the computer storage readable medium. The computer readable storage medium includes at least one of electronic circuitry, storage materials, inorganic materials, organic materials, biological materials, a casing, a housing, a coating, and hardware. A computer readable storage medium may comprise, but is not limited to, a magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), Solid State Devices (SSD), etc. The computer readable storage medium may further comprise digital logic implemented in a hardware device (e.g., an integrated circuit chip, a programmable logic device, a Programmable Gate Array (PGA), field-programmable gate array (FPGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The program code embedded on a computer readable storage medium may be transmitted as transmission signals from a transmitting station or computer to a receiving station or computer. A computer readable storage medium is not comprised solely of transmission signals, but includes tangible components. Those skilled in the art will recognize that many modifications may be made to this configuration without departing from the scope of the present invention, and that the article of manufacture may comprise suitable information bearing medium known in the art.

The computer readable storage medium includes at least some hardware elements and is not solely implemented as transmission signals.

EXAMPLES

The following examples pertain to further embodiments.

Example 1 is a system for protecting data in a storage device, comprising: a storage write counter; a storage commit counter; a table including a table write counter and a table commit counter; a security engine that when executed performs operations, the operations comprising: initiating operations to modify a file; incrementing the storage write counter in response to initiating the operations to modify the file; in response to incrementing the storage write counter, initiating write table operations including setting the table write counter to the storage write counter and setting the table commit counter to the storage commit counter plus a value; performing the operation to modify the file in response to completing the write table operations; and incrementing the system commit counter by the value in response to completing the operation to modify the file.

In Example 2, the subject matter of Example 1 can optionally include that the operations further comprise: in response to a power cycle event, determining whether the table write and commit counters are equal to the storage write and commit counters, respectively; determining whether a failure occurred while performing the operations to modify the file before the file was modified in response to determining that the table write and commit counters are equal to the storage write and commit counters, respectively; and initiating set error state operations to set the table write counter to the storage write counter and the table commit counter to the storage commit counter in response to the determining the failure occurred while performing the operations to modify the file and before the file was modified.

In Example 3, the subject matter of Example 1 and 2 can optionally include that the operations further comprise: in response to completing setting the error state operations, performing: incrementing the storage write counter; setting the table commit counter to the storage commit counter; and incrementing the storage commit counter.

In Example 4, the subject matter of Examples 1-3 can optionally include that the operations further comprise: setting the storage write and commit counters, the table write and commit counters and other table information in response to determining that the failure occurred after the file was modified.

In Example 5, the subject matter of Example 1-4 can optionally include that the determining whether the failure occurred while performing the operations to modify the file comprises determining whether the failure occurred after incrementing the storage write counter and before completing the write table operations.

In Example 6, the subject matter of Examples 1-5 can optionally include that the determining the failure occurred after incrementing the storage write counter and before completing the write table operations comprises determining that the table write counter is equal to the storage write counter less the value and the table commit counter is equal to the storage commit counter.

In Example 7, the subject matter of Examples 2-6 can optionally include that the determining whether the failure occurred while performing the operations to modify the file comprises determining whether the failure occurred after completing the write table operations and before completing the modification of the file during a current failure during which the table write counter was incremented or during a previous failure when the table write counter was not incremented during the current failure In Example 8, the subject matter of Examples 2-7 can optionally include that the determining whether the failure occurred after the write table operations are completed comprises: determining that the table commit counter is equal to the storage commit counter plus the value and one of that the table write counter is equal to the storage write counter and the table write counter is equal to the storage write counter less than the value.

In Example 9, the subject matter of Examples 2-8 can optionally include that the operations further comprise: determining whether the failure occurred while performing the set error state in response to determining that the failure did not occur while performing the operations to modify the file; and performing the set error state operations in response to determining that the failure occurred while performing the set error state operations.

In Example 10, the subject matter of Examples 2-9 can optionally include that the determining whether the failure occurred while performing the operations to modify the file further comprises: determining whether the error state operations completed during a previous failure; performing the error state operations in response to determining the error state operations completed the previous failure; in response to determining the error state operations completed during the previous failure, determining whether the file was successfully modified; performing the error state operations in response to determining the file was successfully modified; and setting a file write counter for the file to modify to a previous version of the file write counter for the file to modify in response to determining that the file was not successfully modified.

In Example 11, the subject matter of Examples 2-10 can optionally include that the operations further comprise: determining whether there are a sufficient number of credits to perform the operations to modify the file, wherein the operations to modify the file are only performed if there are the sufficient number of credits; wherein the write table operations further include determining a credit adjustment based on a time the table was last modified and updating the credits with the determined credit adjustment.

In Example 12, the subject matter of Examples 2-11 can optionally include that the write table operations comprise atomic operations that must all complete to succeed, and further include: indicating the file to modify; setting a pre-modification write counter to a current value of a write counter for the file; setting the write counter of the file to the storage write counter; adjusting credits based on a table time last modified and a current time; and setting the table time last modified to the current time after adjusting the credits.

In Example 13, the subject matter of Examples 2-12 can optionally include that the system comprises a flash memory device including the security engine and the storage device.

In Example 14, the subject matter of Examples 2-12 can optionally include that the table includes a file entry for each file in the storage device to protect, wherein each of the file entries include a write counter set to the system counter when the during the write table operations.

Example 15 is a memory controller coupled to a storage device to protect data in the storage device, comprising: a storage write counter; a storage commit counter; a table including a table write counter and a table commit counter; a security engine that when executed performs operations, the operations comprising: initiating operations to modify a file; incrementing the storage write counter in response to initiating the operations to modify the file; in response to incrementing the storage write counter, initiating write table operations including setting the table write counter to the storage write counter and setting the table commit counter to the storage commit counter plus a value; performing the operation to modify the file in response to completing the write table operations; and incrementing the system commit counter by the value in response to completing the operation to modify the file.

In Example 16, the subject matter of Example 15 can optionally include that the operations further comprise: in response to a power cycle event, determining whether the table write and commit counters are equal to the storage write and commit counters, respectively; determining whether a failure occurred while performing the operations to modify the file before the file was modified in response to determining that the table write and commit counters are equal to the storage write and commit counters, respectively; and initiating set error state operations to set the table write counter to the storage write counter and the table commit counter to the storage commit counter in response to the determining the failure occurred while performing the operations to modify the file and before the file was modified.

In Example 17, the subject matter of Examples 15-16 can optionally include that the operations further comprise: in response to completing setting the error state operations, performing: incrementing the storage write counter; setting the table commit counter to the storage commit counter; and incrementing the storage commit counter.

In Example 18, the subject matter of Examples 15-17 can optionally include that the determining whether the failure occurred while performing the operations to modify the file comprises determining whether the failure occurred after incrementing the storage write counter and before completing the write table operations.

In Example 19, the subject matter of Examples 15-18 can optionally include that the determining whether the failure occurred while performing the operations to modify the file comprises determining whether the failure occurred after completing the write table operations and before completing the modification of the file during a current failure during which the table write counter was incremented or during a previous failure when the table write counter was not incremented during the current failure.

Example 20 is a method for protecting data in a storage device, comprising: initiating operations to modify a file in the storage device; incrementing a storage write counter in response to initiating the operations to modify the file; in response to incrementing the storage write counter, initiating write table operations including setting a table write counter to a storage write counter and setting a table commit counter to the storage commit counter plus a value; performing the operation to modify the file in response to completing the write table operations; and incrementing the system commit counter by the value in response to completing the operation to modify the file.

In Example 21, the subject matter of Example 20 can optionally include that in response to a power cycle event, determining whether the table write and commit counters are equal to the storage write and commit counters, respectively; determining whether a failure occurred while performing the operations to modify the file before the file was modified in response to determining that the table write and commit counters are equal to the storage write and commit counters, respectively; and initiating set error state operations to set the table write counter to the storage write counter and the table commit counter to the storage commit counter in response to the determining the failure occurred while performing the operations to modify the file and before the file was modified.

In Example 22, the subject matter of Examples 20-21 can optionally include that the operations further comprise: in response to completing setting the error state operations, performing: incrementing the storage write counter; setting the table commit counter to the storage commit counter; and incrementing the storage commit counter.

In Example 23, the subject matter of Examples 20-22 can optionally include that the determining whether the failure occurred while performing the operations to modify the file comprises determining whether the failure occurred after incrementing the storage write counter and before completing the write table operations.

In Example 24, the subject matter of Examples 20-23 can optionally include that the determining whether the failure occurred while performing the operations to modify the file comprises determining whether the failure occurred after completing the write table operations and before completing the modification of the file during a current failure during which the table write counter was incremented or during a previous failure when the table write counter was not incremented during the current failure.

In Example 25, the subject matter of Examples 20-24 can optionally include that the write table operations comprise atomic operations that must all complete to succeed, and further include: indicating the file to modify; setting a pre-modification write counter to a current value of a write counter for the file; setting the write counter of the file to the storage write counter; adjusting credits based on a table time last modified and a current time; and setting the table time last modified to the current time after adjusting the credits.

In Example 26, the subject matter of Example 20 can optionally include at least one step of: (1) in response to a power cycle event, determining whether the table write and commit counters are equal to the storage write and commit counters, respectively; determining whether a failure occurred while performing the operations to modify the file before the file was modified in response to determining that the table write and commit counters are equal to the storage write and commit counters, respectively; and initiating set error state operations to set the table write counter to the storage write counter and the table commit counter to the storage commit counter in response to the determining the failure occurred while performing the operations to modify the file and before the file was modified; and/or (2) in response to completing setting the error state operations, performing: incrementing the storage write counter; setting the table commit counter to the storage commit counter; and incrementing the storage commit counter; and/or (3) setting the storage write and commit counters, the table write and commit counters and other table information in response to determining that the failure occurred after the file was modified; and/or (4) wherein the determining whether the failure occurred while performing the operations to modify the file comprises determining whether the failure occurred after incrementing the storage write counter and before completing the write table operations; and/or (5) wherein determining the failure occurred after incrementing the storage write counter and before completing the write table operations comprises determining that the table write counter is equal to the storage write counter less the value and the table commit counter is equal to the storage commit counter; and/or (6) wherein the determining whether the failure occurred while performing the operations to modify the file comprises determining whether the failure occurred after completing the write table operations and before completing the modification of the file during a current failure during which the table write counter was incremented or during a previous failure when the table write counter was not incremented during the current failure; and/or (7) wherein the determining whether the failure occurred after the write table operations are completed comprises: determining that the table commit counter is equal to the storage commit counter plus the value and one of that the table write counter is equal to the storage write counter and the table write counter is equal to the storage write counter less than the value; and/or; (8) determining whether the failure occurred while performing the set error state in response to determining that the failure did not occur while performing the operations to modify the file; and performing the set error state operations in response to determining that the failure occurred while performing the set error state operations; and/or (9) wherein the determining whether the failure occurred while performing the operations to modify the file further comprises: determining whether the error state operations completed during a previous failure; performing the error state operations in response to determining the error state operations completed the previous failure; in response to determining the error state operations completed during the previous failure, determining whether the file was successfully modified; performing the error state operations in response to determining the file was successfully modified; and setting a file write counter for the file to modify to a previous version of the file write counter for the file to modify in response to determining that the file was not successfully modified; and/or (10) determining whether there are a sufficient number of credits to perform the operations to modify the file, wherein the operations to modify the file are only performed if there are the sufficient number of credits; wherein the write table operations further include determining a credit adjustment based on a time the table was last modified and updating the credits with the determined credit adjustment; and/or (11) wherein the write table operations comprise atomic operations that must all complete to succeed, and further include: indicating the file to modify; setting a pre-modification write counter to a current value of a write counter for the file; setting the write counter of the file to the storage write counter; adjusting credits based on a table time last modified and a current time; and setting the table time last modified to the current time after adjusting the credits; and/or (12) wherein the system comprises a flash memory device including the security engine and the storage device; and/or; (13) wherein the table includes a file entry for each file in the storage device to protect, wherein the file entries include a write counter set to the system counter when the during the write table operations.

Example 27 is an apparatus coupled to a storage device to protect data in the storage device, comprising: means for initiating operations to modify a file; means for incrementing a storage write counter in response to initiating the operations to modify the file; means for initiating write table operations including setting a table write counter to the storage write counter and setting a table commit counter to the storage commit counter plus a value in response to incrementing the storage write counter; means for performing the operation to modify the file in response to completing the write table operations; and means for incrementing the system commit counter by the value in response to completing the operation to modify the file.

Example 28 is an apparatus comprising means to perform a method as claimed in any preceding claim.

Example 29 is a machine-readable storage including machine-readable instructions, when executed, to implement a method or realize an apparatus or system as claimed in any preceding claim.

What is claimed:

1. A system for protecting data in a storage device, comprising:
   a storage write counter;
   a storage commit counter;
   a table including a table write counter and a table commit counter;
   a security engine executed to:
      initiate operations to modify a file;
      increment the storage write counter in response to initiating the operations to modify the file;
      in response to incrementing the storage write counter, initiate write table operations including setting the table write counter to the storage write counter and setting the table commit counter to the storage commit counter plus a value;
      perform the operation to modify the file in response to completing the write table operations; and
      increment the storage commit counter by the value in response to completing the operation to modify the file.

2. The system of claim 1, wherein the security engine is further executed to:
   in response to a power cycle event, determine whether the table write counter and the table commit counters are equal to the storage write and the storage commit counters, respectively;
   determine whether a failure occurred while performing the operations to modify the file before the file was modified in response to determining that the table write and the table commit counters are equal to the storage write and the storage commit counters, respectively; and
   initiate set error state operations to set the table write counter to the storage write counter and the table commit counter to the storage commit counter in response to the determining the failure occurred while performing the operations to modify the file and before the file was modified.

3. The system of claim 2, wherein the security engine is further executed to:
   in response to completing the set error state operations:
      increment the storage write counter; and
      set the table commit counter to the storage commit counter; and
      increment the storage commit counter.

4. The system of claim 2, wherein the security engine is further executed to:

set the storage write and the storage commit counters, the table write and the table commit counters and other table information in response to determining that the failure occurred after the file was modified.

5. The system of claim 2, wherein the determine whether the failure occurred while performing the operations to modify the file comprises determine whether the failure occurred after incrementing the storage write counter and before completing the write table operations.

6. The system of claim 5, wherein the determine that the failure occurred after incrementing the storage write counter and before completing the write table operations comprises to determine that the table write counter is equal to the storage write counter less the value and the table commit counter is equal to the storage commit counter.

7. The system of claim 2, wherein the determine whether the failure occurred while performing the operations to modify the file comprises to determine whether the failure occurred after completing the write table operations and before completing the modification of the file during a current failure during which the table write counter was incremented or during a previous failure when the table write counter was not incremented during the current failure.

8. The system of claim 7, wherein the determine whether the failure occurred after the write table operations are completed comprises:
determine that the table commit counter is equal to the storage commit counter plus the value and one of that the table write counter is equal to the storage write counter and the table write counter is equal to the storage write counter less than the value.

9. The system of claim 2, wherein the security engine is further executed to:
determine whether the failure occurred while performing the set error state operations in response to determining that the failure did not occur while performing the operations to modify the file; and
perform the set error state operations in response to determining that the failure occurred while performing the set error state operations.

10. The system of claim 2, wherein the determine whether the failure occurred while performing the operations to modify the file is further to:
determine whether the set error state operations completed during a previous failure;
perform the set error state operations in response to determining the set error state operations completed the previous failure;
in response to determining the set error state operations completed during the previous failure, determine whether the file was successfully modified;
perform the set error state operations in response to determining the file was successfully modified; and
set a file write counter for the file to modify to a previous version of the file write counter for the file to modify in response to determining that the file was not successfully modified.

11. The system of claim 1, wherein the security engine is further executed to:
determine whether there are a sufficient number of credits to perform the operations to modify the file, wherein the operations to modify the file are only performed if there are the sufficient number of credits; and
wherein the write table operations further include to determine a credit adjustment based on a time the table was last modified and updating the credits with the determined credit adjustment.

12. The system of claim 1, wherein the write table operations comprise atomic operations that must all complete to succeed, and further include:
indicate the file to modify;
set a pre-modification write counter to a current value of a write counter for the file;
set the write counter of the file to the storage write counter;
adjust credits based on a table time last modified and a current time; and
set the table time last modified to the current time after adjusting the credits.

13. The system of claim 1, wherein the system comprises a flash memory device including the security engine and the storage device.

14. The system of claim 1, wherein the table includes a file entry for each file in the storage device to protect, wherein each of the file entries include a write counter set to the storage write counter during the write table operations.

15. A memory controller coupled to a storage device to protect data in the storage device, comprising:
a storage write counter;
a storage commit counter;
a table including a table write counter and a table commit counter;
a security engine that is executed to:
initiate operations to modify a file;
increment the storage write counter in response to initiating the operations to modify the file;
in response to incrementing the storage write counter, initiate write table operations including setting the table write counter to the storage write counter and setting the table commit counter to the storage commit counter plus a value;
perform the operation to modify the file in response to completing the write table operations; and
increment the storage commit counter by the value in response to completing the operation to modify the file.

16. The memory controller of claim 15, wherein the security engine is further executed to:
in response to a power cycle event, determine whether the table write and the table commit counters are equal to the storage write and the storage commit counters, respectively;
determine whether a failure occurred while performing the operations to modify the file before the file was modified in response to determining that the table write and the table commit counters are equal to the storage write and the storage commit counters, respectively; and
initiate set error state operations to set the table write counter to the storage write counter and the table commit counter to the storage commit counter in response to the determining the failure occurred while performing the operations to modify the file and before the file was modified.

17. The memory controller of claim 16, wherein the security engine is further executed to:
in response to completing the set error state operations:
increment the storage write counter;
set the table commit counter to the storage commit counter; and
increment the storage commit counter.

18. The memory controller of claim 16, wherein the determine whether the failure occurred while performing the operations to modify the file comprises determine whether the failure occurred after incrementing the storage write counter and before completing the write table operations.

19. The memory controller of claim 16, wherein the determine whether the failure occurred while performing the operations to modify the file comprises determine whether the failure occurred after completing the write table operations and before completing the modification of the file during a current failure during which the table write counter was incremented or during a previous failure when the table write counter was not incremented during the current failure.

20. A method for protecting data in a storage device, comprising:
  initiating operations to modify a file in the storage device;
  incrementing a storage write counter in response to initiating the operations to modify the file;
  in response to incrementing the storage write counter, initiating write table operations including setting a table write counter to a storage write counter and setting a table commit counter to the storage commit counter plus a value;
  performing the operation to modify the file in response to completing the write table operations; and
  incrementing the storage commit counter by the value in response to completing the operation to modify the file.

21. The method of claim 20, further comprising:
  in response to a power cycle event, determining whether the table write and the table commit counters are equal to the storage write and the storage commit counters, respectively;
  determining whether a failure occurred while performing the operations to modify the file before the file was modified in response to determining that the table write and the table commit counters are equal to the storage write and the storage commit counters, respectively; and
  initiating set error state operations to set the table write counter to the storage write counter and the table commit counter to the storage commit counter in response to the determining the failure occurred while performing the operations to modify the file and before the file was modified.

22. The method of claim 21, in response to completing setting the set error state operations:
  incrementing the storage write counter;
  setting the table commit counter to the storage commit counter; and
  incrementing the storage commit counter.

23. The method of claim 21, wherein the determining whether the failure occurred while performing the operations to modify the file comprises determining whether the failure occurred after incrementing the storage write counter and before completing the write table operations.

24. The method of claim 21, wherein the determining whether the failure occurred while performing the operations to modify the file comprises determining whether the failure occurred after completing the write table operations and before completing the modification of the file during a current failure during which the table write counter was incremented or during a previous failure when the table write counter was not incremented during the current failure.

25. The method of claim 21, wherein the write table operations comprise atomic operations that must all complete to succeed, and further include:
  indicating the file to modify;
  setting a pre-modification write counter to a current value of a write counter for the file;
  setting the write counter of the file to the storage write counter;
  adjusting credits based on a table time last modified and a current time; and
  setting the table time last modified to the current time after adjusting the credits.

* * * * *